Nov. 5, 1935.  W. FREVERT  2,019,959
FISHHOOK LURE
Filed May 23, 1935
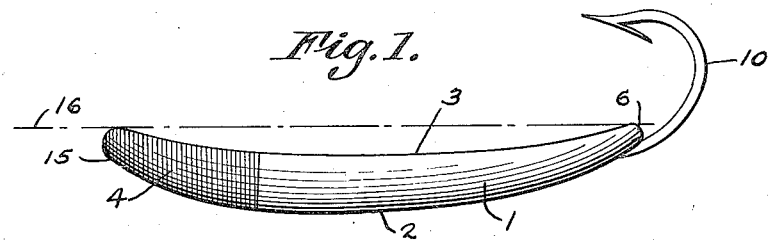
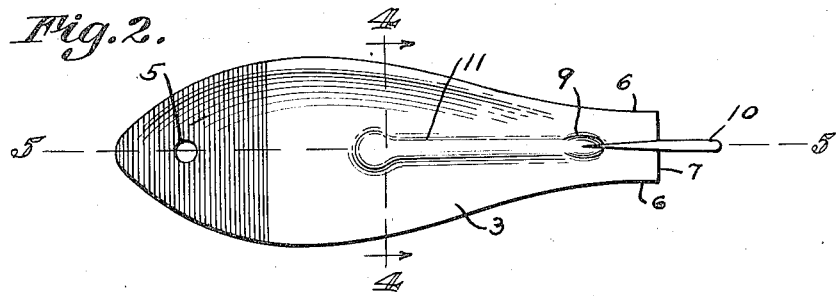
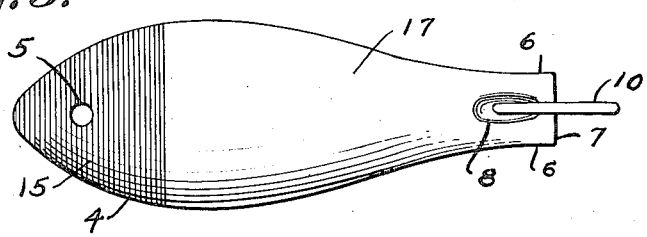
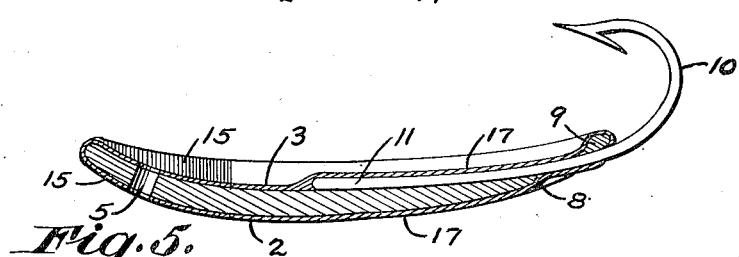
Inventor
WILLIAM FREVERT.
By Howard J. Whelan.
Attorney Patented Nov. 5, 1935

2,019,959

UNITED STATES PATENT OFFICE 2,019,959

FISHHOOK LURE

William Frevert, Belleville, N. J.

Application May 23, 1935, Serial No. 23,095

2 Claims. (Cl. 43—42)

This invention refers to fishing tackle and more particularly to fish-hook lures and hooks for the same. It has among its objects to provide a combined lure and hook capable of positively attracting fish, that will work or operate effectively and readily; that will dart around with the natural irregular swimming movements of the fish of the type it is designed to imitate; that will especially appeal or attract the prey fish that seek a fish of the type indicated by the lure; that will have a simple and uncomplicated structure and have the hook immovably mounted in the lure in a predetermined manner. Other objects will become apparent as the invention is more fully set forth.

In this invention improvements are provided to increase the efficiency of the lure hook over the usual type of such combined hook and lure, by making the lure without a fish-tail form at the tail end, which allows the lure to twist more freely and dart more effectively in the water while being trolled. The body of the lure which is of a small fish form is concave on one side and convexed on the opposite side, while the thickness is practically uniform throughout. The body from the head to the tail is arranged wholly on one side of an axis passing from the tip of the head to the tip of the so-called tail. In addition the fish lure is painted with a fish scale paint and its head, a deep blood like red. This last feature is of particular value as it excites the eating faculties of the prey fish abnormally and makes it recklessly rush after its intended victim. There are certain inherent sentiments or influences in a fish, one of which is to seek fresh water at certain periods of its existence, and another is to be ravenous after blood in a more or less degree. In the case of the Pirahna and other fish of Brazilian and tropical waters, this taste or desire reaches a degree of madness in the fish. A mere drop in a river where such fish exist will act to bring a whole school of these fish to the location and with maddish intensity tear to pieces any blooded warm creature in that vicinity. In the case of the sport fish usually met with, the taste for blood or what looks like blood to it, is not so impelling, but it is at least quite fundamental under normal conditions, increasing as hunger excites the sentiment. The use of this principle is a feature of this invention, which has not been heretofore used for this class of device. Another feature is in that the stem of the hook is molded directly in the lure material and therefore cannot change its position or be lost by some part loosening or detaching itself. This last feature also enables the hook to have a more desirable resilient action suitable to the purposes of the lure and hook. The paint used has a fish-like aspect, attractive to the prey fish, because it has a base of fish scales.

In the drawing, which illustrates by way of example, an embodiment of this invention:—

Figure 1 is a side elevation of a combination lure and hook embodying this invention.

Figure 2 is a plan view of the device shown in Figure 1.

Figure 3 is a bottom view of the device shown in Figure 1.

Figure 4 is a transverse sectional view on line 4—4 of Figure 2, and

Figure 5 is a longitudinal sectional view on line 5—5 of Figure 2.

Similar reference characters refer to similar parts throughout the drawing.

In the construction shown 1 represents a fish-bait-body lure formed preferably of metal and as indicated in the drawing. This structure provides for a convexed exterior side 2 and a concaved interior side 3; the thickness being relatively uniform throughout the length of the body, which can be noted in the sectional views. The whole fish is painted with fish-scale paint of natural gloss and tint 17, except the head portion.

The head portion converges as indicated at 4 and is painted with fish-scale paint tinted a deep blood red 15, the area being that of a quasi-equilateral triangle. A line hole 5 is provided in the snoot of the head portion. The tail portion 6 of the fish is cut flat and straight across as shown at 7. Adjacent the rear line 7 is provided a recess 8 on the exterior side and another 9 on the interior side, the depressions or recesses being preferably formed as indicated in the drawing. A hook 10 projects from the tail portion and is aligned with the axis 16 of the body 1 over the interior side thereof. The shank 11 of the hook is molded into the body and entirely concealed except at the depression 9 where it projects from the depression 8. This molding-in arrangement makes the hook stay rigidly in place and allows no twisting of the hook itself that might assist the victim fish to escape. At the same time, there is no chance of the hook loosening up and coming off the lure as would be the case if nuts and bolts and other mechanical means were used to hold it on.

In the use of the device, the line tackle is attached at the hole 5 and the lure hook is trolled along. In its movement through the water the fish bait body darts about in quite a fish like manner. This movement has a peculiar screw-like movement including an erratic directional action and a twisting of the hook in a rotary manner. If run along the top of the water the device will occasionally dart out along the surface and has a very real appearance. At it passes through the water, the fish scale paint takes on the natural flashes of the fish and combined with the red coloring makes it more fish like and particularly attractive. The result has been that the catch of fish with the lure-hook described has been relatively large compared with other types used in the same locality.

The depressions 8 and 9 serve to make ripples in the water, stir up same and accentuate actions which attract prey fish.

The arrangement of the hook as indicated also serves to catch the prey fish more positively.

While but one form of the invention is shown in the drawing it is not intended to limit the invention to that particular form or in any other way, otherwise than limited by the prior art, as it is appreciated that other forms of the invention might be constructed, employing the same principles and coming within the scope of the appended claims.

Having thus described the invention, what is claimed is:—

1. A lure hook of the class described comprising in combination, a fish-like body of substantially uniform thickness having an interior concaved side and an exterior convexed side, both extending longitudinally along the body, said body having said sides limited to an arc below the axis line extending from the tip of the body to its tail, the tail of the body being cut straight across at right angles to the axis, a painted covering on the body adapted to give it a fish-like sheen, a hook molded in the body and extending the concaved side and aligned with the axis aforesaid, and means for attaching a tackle line to the body.

2. A lure hook of the class described comprising in combination, a fish-like body of substantially uniform thickness having an interior concaved side and an exterior convexed side, both extending longitudinally along the body, said body having said sides limited to an arc below the axis line extending from the tip of the body to its tail, the tail of the body being cut straight across at right angles to the axis, a painted covering on the body adapted to give it a fish-like sheen, a hook molded in the body and extending over the concaved side and aligned with the axis aforesaid, means for attaching a tackle line to the body and means on the head portion extending about one-fourth the length of the body for particularly accentuating that portion colorfully.

WILLIAM FREVERT.